United States Patent [19]

Ruckel

[11] 4,348,237

[45] Sep. 7, 1982

[54] ADDITIVE COMPOSITION AND METHOD OF USING SAME

[75] Inventor: P. Jay Ruckel, Ponca City, Okla.

[73] Assignee: Conoco Inc., Ponca City, Okla.

[21] Appl. No.: 161,714

[22] Filed: Jun. 20, 1980

[51] Int. Cl.$^3$ ................ C08L 91/00; C08L 95/00
[52] U.S. Cl. ................................ 106/122; 106/243; 106/246; 106/273 R
[58] Field of Search ............ 106/122, 243, 246; 252/35, 21, 38, 39

[56] References Cited

U.S. PATENT DOCUMENTS

| | | | |
|---|---|---|---|
| 1,694,148 | 12/1928 | Spalding | 252/35 |
| 1,749,251 | 3/1930 | Klemgard | 252/35 |
| 1,804,124 | 5/1931 | Southard | 252/35 |
| 2,205,740 | 6/1940 | Wunsch | 252/35 |
| 2,585,119 | 2/1952 | Hanson et al. | 106/273 R |
| 2,901,369 | 8/1959 | Pordes | 106/122 |

*Primary Examiner*—Theodore Morris
*Attorney, Agent, or Firm*—Richard W. Collins

[57] ABSTRACT

An additive composition and a method for using same are disclosed. The additive is useful in preparation of foamed bitumens such as asphalt used in manufacture of bituminous pavements. The additive is comprised of a metal stearate and a carrier oil, and is added to asphalt used to manufacture asphalt foam compositions to improve the foaming characteristics of the asphalt.

3 Claims, No Drawings

ADDITIVE COMPOSITION AND METHOD OF USING SAME

BACKGROUND OF THE INVENTION

In an effort to improve the basic asphalt paving process, attempts have been made to utilize foamed asphalt processes in place of conventional asphalt pavement mixing methods.

One foamed asphalt process is described in U.S. Pat. No. 2,917,395 to L. H. Csanyi. This process involves use of steam to produce foamed asphalt, which is then mixed with a substrate.

Another approach was proposed in U.S. Pat. No. 3,423,222 to McConnaughay. The method disclosed in that patent involves heating aggregate in a drum and coating the hot aggregate with a turbulent dispersion or cloud of asphalt.

More recently, a process of making foamed asphalt suitable for mixing with unheated aggregate has been developed. This process involves combining cold water with hot liquid asphalt to produce a foamed asphalt, and is described in detail in Australian Pat. No. 433,003.

The use of cold water and heated asphalt to produce a foamed product has showed considerable promise as an alternative to the conventional hot mix paving process. However, it is essential that the asphalt used have good foaming characteristics in order for the foamed asphalt process to be successful.

Unfortunately, it is not uncommon in the manufacture, storage and handling of asphalt to use a silicone defoamer to prevent froth formation. This silicone additive is very effective as a froth preventer, but it remains in the asphalt, and when a silicone-containing asphalt is subsequently used in a foamed asphalt process, the resulting foam is not easily formed and is of poor quality. Some asphalts simply do not have good foaming characteristics, whether or not a defoamer has been added, and the additive of this invention may be used to improve the foaming characteristics of these asphalts.

Prior attempts to improve the foaming characteristics of asphalt which is used to produce a foamed asphalt paving composition have included addition of foaming agents to the water or asphalt prior to generating the foam. One fairly satisfactory material is powdered sodium stearate, which has been added in amounts of a few tenths of a percent based on weight of asphalt to be foamed. This powdered sodium stearate effectively overcomes silicone defoamer if present and allows formation of a good foamed asphalt. However, the use of powdered material is very difficult in an actual paving operation, presenting handling problems and causing difficulty in obtaining uniform dispersion of the additive. Attempts to dissolve metal stearate in a satisfactory oil carrier have not been very successful, as the resulting solutions thicken such that they are not readily pumpable by an additive metering pump or the like.

Solutions of metal stearates in light hydrocarbon solvents are used in the paint industry, but these solutions are unsatisfactory for use around heated asphalt due to adverse effects of light hydrocarbons on the asphalt properties and because of hydrocarbon emission and safety considerations.

SUMMARY OF THE INVENTION

According to the present invention, an additive composition for improving the foaming characteristics of asphalt is provided. According to another aspect of the invention, a method for using such an additive is provided.

The additive according to the invention comprises a metal stearate dispersed in a carrier oil having specific properties. The stearate is present in an amount of at least 20 percent by weight, with the balance being carrier oil. Minor amounts of other materials can be present, but are not required.

The method of using the additive comprises adding it to an asphalt material to be foamed prior to generation of the foam.

DESCRIPTION OF THE PREFERRED EMBODIMENTS

The active ingredient in the additive of this invention is the metal stearate. It is theoretically possible to obtain the advantages of the invention using a powdered material, but as a practical matter it has been determined that a more satisfactory method of adding this material is as a liquid. A satisfactory liquid additive should be readily dispersable in hot asphalt, and should contain no appreciable amount of volatile fractions which might create safety or health hazards or product specification problems. It is also essential that the additive be stable during extended storage over a fairly wide range of ambient temperature, that the additive have no appreciable effect on the properties of the asphalt, and that the additive have good flow characteristics over a fairly wide temperature range.

It has been found that the above properties can be obtained by dispersing powdered metal stearate in a hydrocarbon carrier oil having a pour point of not more than 0° C., an initial boiling point of at least 200° C., and a flash point (Cleveland Open Cup) of at least 150° C.

Metal stearates in general are useful in this invention. The most preferred stearate is magnesium stearate, although calcium, aluminum and sodium stearates have also been found to be particularly desirable. The concentration of metal stearate in the composition should be as high as possible without being so high as to be non-liquid at ambient temperatures. At least 20 percent by weight is needed to avoid having to ship and handle an unduly large volume of material. Preferably, an amount just short of the amount which causes thickening of the composition at ambient temperature is used. When amounts of metal stearates above about 35 percent by weight are dispersed in carrier oils, the fluidity of the composition at ambient temperatures decreases quite rapidly, and in order to avoid potential field problems and at the same time minimize the amount of additive to be handled, an optimum amount of metal stearate has been determined to be about 33 to 38 percent by weight.

Numerous hydrocarbon materials were tried as carrier oils. Essential properties of a satisfactory carrier oil in accordance with the invention are a pour point of not more than 0° C., an initial boiling point of at least 200° C., and a flash point of at least 150° C. The most preferred carrier oil is a low viscosity, fully refined base lubricating pale oil. Oils that are too heavy and viscous result in too viscous a blend due to their initial viscosity and also present a problem in that the required higher blending temperatures cause solution of the metal stearate with resulting thickening of the blend. Oils that have too low an initial boiling point cause undesirable hydrocarbon emissions when mixed with hot asphalt and do not provide a stable blend. Oils with a high pour point present handling problems, and oils with a low flash point present a safety hazard. A particularly preferred oil is a fully refined paraffinic base lubricating oil having the properties shown in the following table.

TABLE I

| Flash Point (COC) | 210° C. |
| --- | --- |
| Pour Point | −15° C. |
| Specific Gravity | 0.8697 |
| API Gravity | 31.2° |
| Viscosity, cSt | 34 at 40° C. |
|  | 5.5 at 100°C. |
| Viscosity Index | 98 |
| Distillation, ASTM D1160 corrected to 760 mm | 288° C. Initial Boiling Point |
|  | 360° C. 10% Point |
|  | 427° C. 50% Point |

Dispersions of metal stearates in a carrier oil as defined in Table I were prepared, and had the following properties at ambient temperature:

| Metal Stearate | Concentration % by wt. | Property |
| --- | --- | --- |
| Calcium Stearate | 30 | Fully Liquid |
|  | 35 | Slightly Thickened |
|  | 40 | Non-Liquid* |
| Magnesium | 30 | Fully Liquid |
|  | 35 | Slightly Thickened |
|  | 40 | Non-Liquid* |

*Not readily pourable from an open container at ambient temperature.

The process of preparing the additive comprises dispersing powdered metal stearate in carrier oil while maintaining the carrier oil at a temperature below that at which appreciable dissolution of the stearate occurs. The carrier oil should not be at a temperature above about 50° C. because the metal stearates tend to dissolve in hot oil and the resulting solutions thicken on cooling to the point that they are not readily usable. Additives prepared at ambient temperature contain no appreciable amount of dissolved metal stearate.

The method of using the additive of this invention involves blending an effective amount of the additive into asphalt, contacting heated asphalt containing the additive with water, and expanding the heated asphalt and water through a nozzle as a foamed asphalt. The amount of additive used depends on the particular metal stearate and the desired results in terms of expansion volume and foam half life. For aluminum or magnesium stearate, about 0.15 percent by weight metal stearate based on weight of asphalt is adequate. For sodium stearate, about 0.3 weight percent is adequate.

The asphalt to be foamed, containing the additive of this invention, must be hot enough to be liquid, and have sufficient heat capacity to vaporize the added water. The added water is heated above its boiling point by the heated asphalt, and the resulting mix is then expanded through a nozzle as a foam having an increased volume, preferably from 6 to 15 times the volume of the original asphalt. An aggregate material is then added to the foamed asphalt to provide a mix suitable for use in having projects and the like. The additive according to this invention makes it possible to utilize foamed asphalt in preparation of road beds in an economical and effective manner.

Prior to development of this additive, there was no completely satisfactory way of overcoming the effects of poor foaming asphalt when the asphalt was to be used to produce a foamed asphalt mix.

I claim:

1. In a method of generating foamed asphalt wherein heated liquid asphalt is contacted with liquid water and subsequently expanded through a nozzle to generate a foamed asphalt, the improvement wherein an effective amount of a liquid additive comprising at least 20 percent by weight metal stearate dispersed in a hydrocarbon carrier oil having a poor point of not more than 0° C., an initial boiling point of at least 200° C. and a flash point of at least 150° C. is added to said asphalt prior to generation of said foam, said metal stearate being present in an amount less than the amount which would render the additive non-liquid at ambient temperatures.

2. The method of claim 1 wherein said metal stearate is magnesium stearate and sufficient additive is added to provide 0.15 percent by weight magnesium stearate based on the weight of said asphalt.

3. A liquid additive composition comprising:
 (a) a hydrocarbon carrier oil comprising a low viscosity, fully refined base lubricating pale oil having a pour point of not more than 0° C., an initial boiling point of at least 200° C., and a flash point of at least 150° C.; and
 (b) magnesium stearate dispersed in said carrier oil in an amount of from 33 to 38 percent by weight of said composition, said amount being less than the amount which would render the composition non-liquid at ambient temperatures.

* * * * *